B. GAST.
MOTOR CULTIVATOR.
APPLICATION FILED JULY 16, 1912.
1,051,836. Patented Jan. 28, 1913.
Fig. 1.
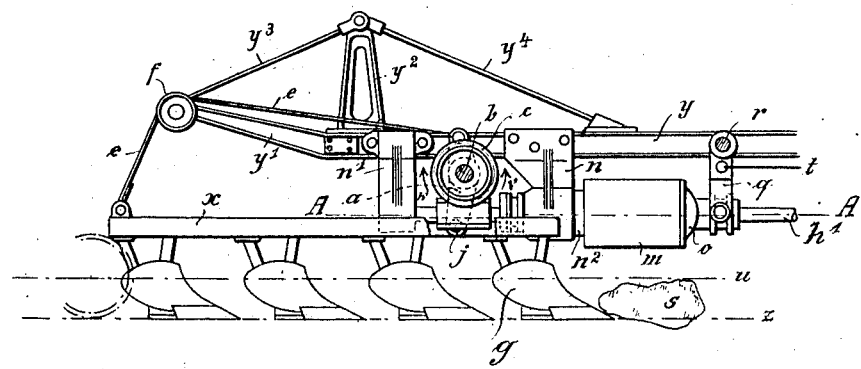
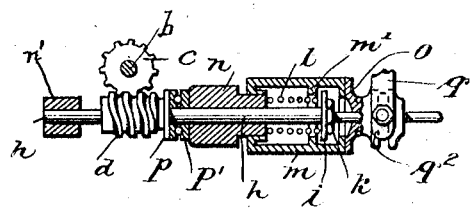
Fig. 4.
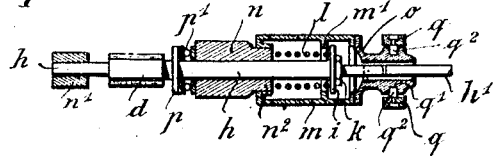
Fig. 2.
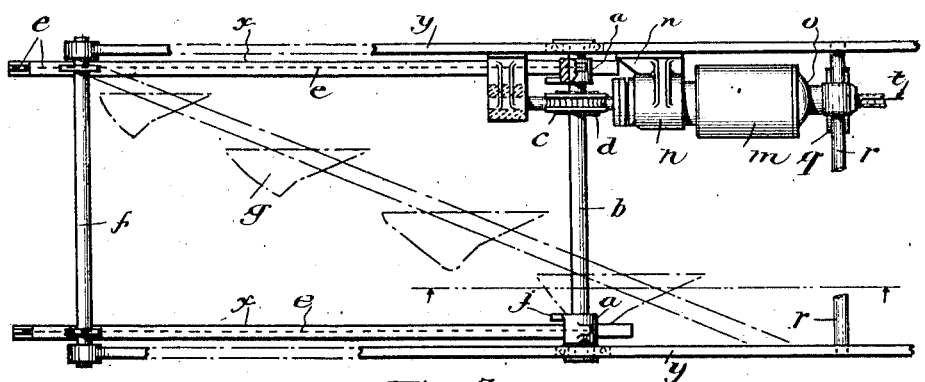
Fig. 3.
Witnesses:
Waldo M. Chapin
Ida M. Patterson
Inventor
Bruno Gast
by
Rosenbaum & Stockbridge
Attys.

UNITED STATES PATENT OFFICE.

BRUNO GAST, OF BAUMSCHULENWEG, BERLIN, GERMANY.

MOTOR-CULTIVATOR.

1,051,836.   Specification of Letters Patent.   Patented Jan. 28, 1913.

Application filed July 16, 1912. Serial No. 709,629.

*To all whom it may concern:*

Be it known that I, BRUNO GAST, a subject of the King of Saxony, residing at Baumschulenweg, Berlin, in the Empire of Germany, have invented a new and useful Motor-Cultivator, of which the following is a specification.

My invention relates to improvements in motor-cultivators, more particularly in motor-plows having a plowshares holding frame suspended from the vehicle frame and capable of being raised and lowered parallel to the ground.

By the improvements the motor-cultivator on encountering during the drive some considerable obstacle hidden in the ground is enabled to automatically withdraw its implements from under the obstacle rearward out of the ground and to stop. When the considerable obstacle is visible, the operator is by the improvements enabled to withdraw at will and in time the implements from the ground and to stop the motor-cultivator. Thereby all dangers of the implements being broken or damaged by the obstacle and every breakdown of the motor or motor-cultivator are avoided, while the motor may be permitted to continue running and the driving wheels of the vehicle need not root up the ground.

The implements holding frame is according to my invention near its front end pivotally connected with the lower arms of two-armed levers fastened on an operating shaft which is mounted in the vehicle frame to rock, while the rear end of the implements holding frame is connected with the upper arms of the said levers by means of drawing-means passing over guiding pulleys on the vehicle frame. In this manner the implements holding frame can be moved in a vertical arc upward rearwardly and downward forwardly and parallel to the ground. A worm wheel is keyed upon the operating shaft and meshes with a worm on a worm shaft, which latter is mounted in the vehicle frame to turn and to longitudinally move. The weight of the implements holding frame tends to press the worm shaft against a ball-bearing on the vehicle frame. Any obstacle in the ground, which may strike one or several of the implements, tends to push the implements holding frame to the rear and by means of the two-armed levers and the worm gearing also the worm shaft to the rear. A spring is provided for counteracting the thrust produced by the obstacle and means connected with the worm shaft are provided for throwing either the motor or the mechanism for driving the running wheels of the vehicle out of gear.

I will now proceed to describe my invention with reference to the accompanying drawing, in which—

Figure 1 is a vertical longitudinal section through a part of an improved motor-cultivator and shows a plowshares holding frame, only so much being shown as is necessary for the understanding of the invention, Fig. 2 is a horizontal section through the line A—A in Fig. 1. Fig. 3 is a plan view of the motor plow, certain parts being omitted for the sake of clearness, and Fig. 4 is a detail view partly in section of the worm gear and associated parts.

Similar letters of reference refer to similar parts in both views.

The vehicle-frame may comprise two parallel longitudinal beams $y$ (of which only rear parts are shown in Fig. 1), two parallel rear extensions $y^1$, two parallel supports $y^2$ and two pairs of braces $y^3$ and $y^4$ for carrying the rear ends of the rear extensions $y^1$. Between the two beams $y$ two brackets $n$ and $n^1$ are secured, the lower ends of which form two bearings for a worm shaft $h$ that can turn and longitudinally move in them. The worm shaft $h$ may be made in one with a long worm $d$ which meshes with a worm wheel $c$ fastened on an operating shaft $b$, that is mounted to rock in two parallel shields (not shown) connected in any known manner with the two beams $y$ and the two brackets $n$ and $n^1$. On the operating shaft $b$ are fastened two parallel two-armed levers $a$, the lower arms of which are at their free ends $j$ pivotally connected with a plowshares holding frame $x$ near its front end, while the upper arms of the levers $a$ are at their free ends connected by means of two drawing means $e$, such as chains or ropes, passing over guiding pulleys $f$ at the free ends of the extensions $y^1$ with the rear end of the frame $x$. I do not further describe the construction of the vehicle-frame nor that of the plowshares holding frame, as they are immaterial to my invention. The shares $g$ are adapted to cut into the ground from the upper surface represented by the dotted line $u$ down to a depth indicated by the line $z$ which is parallel to $u$. It will be understood, that when the worm wheel $c$ is turned in the direction of the arrow $w$ in Fig. 1, the plowshares holding frame $x$ will be thereby moved in an arc upward rearwardly, and when the worm wheel $c$ is turned in the direction of the arrow $v$, the frame $x$ will be thereby moved in an arc downward forwardly. In all cases the plowshares holding frame $x$ is moved parallel to the ground. Where so preferred, the lower ends of the two brackets $n$ and $n^1$ or of the two said shields may guide the plowshares holding frame $x$.

For taking up the thrust of the worm $d$ produced by the weight of the plowshares holding frame $x$ preferably a ball-bearing $p^1$ is inserted between the bracket $n$ and a collar $p$ which is fixedly secured on the worm shaft $h$ the ball-bearing being fixed to bracket $n$. The bracket $n$ has a cylindrical projection $n^2$ concentric with the shaft $h$ and on this projection a cylindrical casing $m$ is guided. A helical spring $l$ contained in this casing surrounds the worm shaft $h$ and is made to bear on the one hand against the projection $n^2$ and on the other hand against a loose collar $i$ secured on the shaft $h$ by means of a shoulder and a nut $k$. The casing $m$ has an inner annular projection $m^1$, which is normally in contact with the loose collar $i$. The casing $m$ is closed with a disk $o$ fastened to the casing $m$ about a shaft $h^1$ in the axis of the worm shaft $h$. Shaft $h^1$ is preferably rigidly secured to $h$. The disk $o$ has an annular groove $q^1$, in which two opposite pins $q^2$ at the lower free ends of two levers or a forked lever $q$ engage. The two levers or the forked lever $q$ is mounted to rock in the vehicle frame at $r$ and are or is pivotally connected with a rod $t$, which is in any known manner connected with a controlling valve of the motor or with some movable part of a mechanism for driving the running wheels of the vehicle, so that, when the rod $t$ is moved by the levers or lever $q$ to the left in Fig. 1, either the motor or the motor-cultivator is to be thereby stopped. The shaft $h^1$ is in any known manner adapted to be turned at will in one or the other direction either by hand or from the motor for turning the worm wheel $c$ in the respective direction by means of the parts $h$ and $d$.

When during the drive of the motor-cultivator any plowshare $g$ should strike some hidden obstacle, for example a large stone $s$ in the ground, it will be thereby stopped, while the motor continues running, that is the motor-cultivator continues its forward motion. In consequence of this the stone $s$ will push the plowshares holding frame $x$ to the rear, so that by means of the two levers $a$ and the drawing means $e$ the worm wheel $c$ will be turned in the direction of the arrow $w$, which means, that the worm wheel $c$ will push the worm $d$ with the worm shaft $h$ to the rear, whereby the strained helical spring $l$ will be compressed. Then by means of the loose collar $i$ in contact with the inner projection $m^1$ the casing $m$ will be shifted to the left and consequently by means of the parts $o$, $q^2$, $q$ the rod $t$ will be also shifted to the left, whereby the motor or the motor-cultivator will be stopped. It is evident, that when the stone $s$ strikes any plowshare, the plowshares holding frame will be moved in an arc upward rearwardly, so that the respective plowshare may disengage from the stone. In this manner both the plowshares holding frame and the vehicle-frame are protected from ruptures and also the motor or the gears driving the running wheels are prevented from breaking under the action of any sudden stoppage. The ball-bearing $p^1$ should be so constructed in any known manner, as to prevent the balls from dropping off, in case the ball-bearing is moved off from the bracket $n$. The helical spring $l$ can be adjusted so that it does not act to throw the plowshare holding frame at every thrust which is produced by the encountering of some obstacle by one of the plows, but will yield when a thrust of a predetermined force is exerted by such encounter. It will thus be seen that it is possible for the operator to turn the worm wheel $c$ at will in either direction for avoiding any visible obstacle during the drive of the motor-cultivator. At the same time the helical spring $l$ will enable the motor-cultivator to automatically stop, should it encounter some hidden obstacle.

The invention can be applied to other motor-cultivators than motor-plows.

The mechanism described can be varied in many respects without departing from the spirit of my invention.

I claim:

1. In a motor-cultivator, the combination with a vehicle frame, of a shaft mounted in said vehicle frame to rock, an implements holding frame, lower arms on said shaft pivotally connected with the front end of said implements holding frame, upper arms on said shaft, guiding pulleys on said vehicle frame, and drawing means passing over said guiding pulleys and connecting said upper arms with the rear end of said implements holding frame, so that any obstacle in the ground can push said implements holding frame upward rearwardly out of the ground.

2. In a motor-cultivator, the combination with a vehicle frame, of an operating shaft mounted in said vehicle frame to rock, an implements holding frame, arms on said operating shaft for moving said implements holding frame in a vertical arc parallel to the ground, a worm wheel on said operating shaft, a worm shaft mounted in said vehicle frame to turn and to longitudinally move, a worm on said worm shaft for meshing with said worm wheel, and a spring for pressing said worm shaft against the thrust produced by any obstacle in the ground, whereby by turning said worm shaft in either direction, said implements holding frame will be lowered and raised and can be pushed by any obstacle upward rearwardly out of the ground.

3. In a motor-cultivator, the combination with a vehicle frame, of an operating shaft mounted in said vehicle frame to rock, an implements holding frame, arms on said operating shaft for moving said implements holding frame in a vertical arc parallel to the ground, a worm wheel on said operating shaft, a worm shaft mounted in said vehicle frame to turn and to longitudinally move, a worm on said worm shaft for meshing with said worm wheel, a spring for pressing said worm shaft against the thrust produced by any obstacle in the ground, whereby by turning said worm shaft in either direction, said implements holding frame will be lowered and raised and can be pushed by any obstacle upward rearwardly out of the ground, and means connected with said worm shaft adapted to stop the motor or the motor-cultivator.

BRUNO GAST.

Witnesses:
 WOLDEMAR HAUPT,
 HENRY HASPER.